United States Patent [19]

Redmond et al.

[11] Patent Number: 5,584,650
[45] Date of Patent: Dec. 17, 1996

[54] LUBRICATION SYSTEM

[76] Inventors: Frederick D. Redmond, 5 Mayalls Close, Tirley, United Kingdom, GLOS GL19 4HW; Alan D. Whitby, 13 Graystone Close, Milton, Tewkesbury, United Kingdom, GLOS GL20 8AY

[21] Appl. No.: 411,637

[22] PCT Filed: Oct. 6, 1993

[86] PCT No.: PCT/GB93/02078

§ 371 Date: Jun. 5, 1995

§ 102(e) Date: Jun. 5, 1995

[87] PCT Pub. No.: WO94/08176

PCT Pub. Date: Apr. 14, 1994

[30] Foreign Application Priority Data

Oct. 6, 1992 [GB] United Kingdom ............ 9220991

[51] Int. Cl.⁶ .................................................. F01D 1/12
[52] U.S. Cl. .................... 415/55.5; 415/169.1; 184/6.23; 184/6.4
[58] Field of Search ............... 415/55.5, 55.6, 415/83, 84, 169.1; 184/6, 6.24, 6.23

[56] References Cited

U.S. PATENT DOCUMENTS

| | | |
|---|---|---|
| 3,800,913 | 4/1974 | Schmitt . |
| 4,408,952 | 10/1983 | Schweinfurter ............ 415/55.6 |
| 4,414,006 | 11/1983 | Armstrong . |
| 4,653,979 | 3/1987 | Schillinger ............... 415/84 |
| 4,714,139 | 12/1987 | Lorenz et al. ............ 184/6.24 |
| 4,844,202 | 7/1989 | Maresko ................. 184/6.24 |
| 5,009,575 | 4/1991 | Hanai et al. ............ 415/55.5 |

FOREIGN PATENT DOCUMENTS

| | | | |
|---|---|---|---|
| 2134598 | 8/1984 | United Kingdom | 415/55.6 |
| PCT/DE91/00449 | 1/1992 | WIPO . | |
| PCT/GB91/02243 | 6/1992 | WIPO . | |

*Primary Examiner*—Thomas E. Denion
*Attorney, Agent, or Firm*—Marshall, O'Toole, Gerstein, Murray & Borun

[57] ABSTRACT

A lubrication system comprising a first pump (2) to deliver lubricating oil from a reservoir (1) to equipment to be lubricated (9), a second pump (11) to return lubricating oil from the equipment (9) to the reservoir (1), and characterised in that both pumps (2, 11) are mounted on a common drive shaft (19) and each comprises a regenerative type pump with the second pump (11) having an air bleed (40) connected to the reservoir (1) from an inner region of the pump impeller (21) in which air accumulates. The first and second pumps (2, 11) may comprise separate impellers (20, 21) or a common impeller (60 or 74). The second pump (11) may comprise two or more guide channels (34, 34') on the same or opposite sides of the impeller, each associated with a series of cells (32) and respective pump inlet and outlet ports (36, 36'; 38, 38') and an air bleed (40, 40') so as to function as a separate scavenge pump to return lubricating oil to the reservoir (1).

7 Claims, 5 Drawing Sheets

LUBRICATION SYSTEM

TECHNICAL FIELD

This invention relates to a lubrication system comprising a pump which pumps lubrication oil from a reservoir and delivers it to equipment to be lubricated.

A common problem with lubrication systems is that of air in the lubrication oil which can impair performance of the pump and reduce the delivery rate of oil to the equipment. This problem is overcome by providing an air/oil separator in the system, which in the case of aerospace systems, commonly comprises a cellular metallic filter body through which the oil is fed as the body is spun. The filter body is mounted on a shaft with a scavenge pump which feeds the lubricating oil from the reservoir to the filter body. A gear pump then takes the de-aerated supply of lubricating oil from the scavenge pump and delivers this under pressure to the equipment. The gear pump is driven at a different speed to the scavenge pump, and is mounted on a separate drive shaft. A pressure relief valve is connected in the lubrication circuit of the gear pump, together with a particulate filter to protect the pump. These known aerospace lubrication systems are therefore relatively complicated an costly to manufacture, and trend to be heavy, which is generally a serious disadvantage of any aerospace equipment.

DISCLOSURE OF THE INVENTION

An object of the present invention is to provide an improved lubrication system suitable for aerospace applications.

This is achieved according to the invention by providing a lubrication system comprising a first pump means to deliver lubricating oil from a reservoir to equipment to be lubricated, a second pump means to return lubricating oil from the equipment to the reservoir, and characterised in that both pump means are mounted on a common drive shaft and each comprises a regenerative type pump means with the second pump means having an air bleed connected to the reservoir from an inner region of the pump impeller in which air accumulates.

A regenerative type pump has an impeller with a plurality of blades forming a series of cells spaced angularly around the axis of rotation of the impeller, and a housing with a flow channel extending between a pump inlet and pump outlet including a guide channel located alongside the impeller so that the cells open laterally of the plane of rotation of the impeller into the guide channel and cooperate therewith to induce a spiral or helical flow of fluid through the guide channel and cells along the length of the flow channel as the impeller rotates. The term "regenerative type pump" and "regenerative type pump means" as used herein shall be taken to have the meaning given in the preceding sentence.

Regenerative type pumps offer significant advantages compared with positive displacement pumps such as gear pumps. For example, regenerative pumps are inherently simpler and more compact in construction with a lower number of components that allow a reliable, lighter pump to be produced which, because of normal impeller/housing clearances, can tolerate liquids containing certain levels of particulate contaminants.

Another feature of regenerative type pumps is their ability to handle liquid/gas mixtures and to be self-priming if the pump outlet is located towards an inner region of the impeller. Liquid then collects towards the outer region of the flow channel and forms a "liquid ring" which pumps gas displaced towards the inner region because of its lower density. This characteristic is made use of in the invention by connecting an air bleed to the inner region of the second pump means to remove air separately from the lubricating oil output of the pump means to the reservoir.

It will be appreciated that a lubrication system according to the invention can be made in a more compact and lighter form than the known aerospace lubrication systems, by virtue of the fact that it involves combining two pump means on a common drive shaft and avoiding the need for separate driven air filter bodies and pressure relief valves.

The first and second regenerative type pump means may be formed on different impellers mounted on the common shaft, or on the same impeller, thereby further simplifying the lubrication system. Where the first and second pump means are formed on the same impeller, they may be formed on the same or opposite sides of the impeller, and where on the same side of the impeller, they may each comprise a guide channel on a common radius so that each occupies a different sector of the impeller side face and are both associated with the same series of cells on the impeller that open laterally into the guide channels. Alternatively, two guide channels may be provided on the same side of the impeller on different radii, each associated with a different respective series of cells on different radii of the impeller. Each guide channel can then independently occupy the maximum circumferential length of the impeller side face or as much of it as required. Furthermore, where the first and second pump means are formed on the same side of the impeller, the two sides of the pump on opposite sides of the impeller may be mirror images of one another with series of cells on both sides of the impeller being inter-connected axially.

The second regenerative pump means may comprise two or more guide channels on the same or opposite sides of the impeller, each associated with a series of cells on the impeller that open laterally into the guide channel and induce a flow of fluid along the guide channel between a respective pump inlet and pump outlet, each guide channel being connected via its pump inlet and pump outlet in a separate lubricating oil circuit to return lubricating oil from the equipment to the reservoir, and each guide channel having associated with it an air bleed to deliver air to the reservoir from an inner region of the impeller where the air accumulates. Thus, the second pump means can serve multiple scavenge functions, the pressure rise required of the pump means for each function being relatively modest so that multiple guide channels can be provided on a common radius of the impeller.

DESCRIPTION OF THE DRAWINGS

The invention will now be described by way of example with reference to the accompanying drawings in which.

MODE OF CARRYING OUT THE INVENTION

Figure 1:
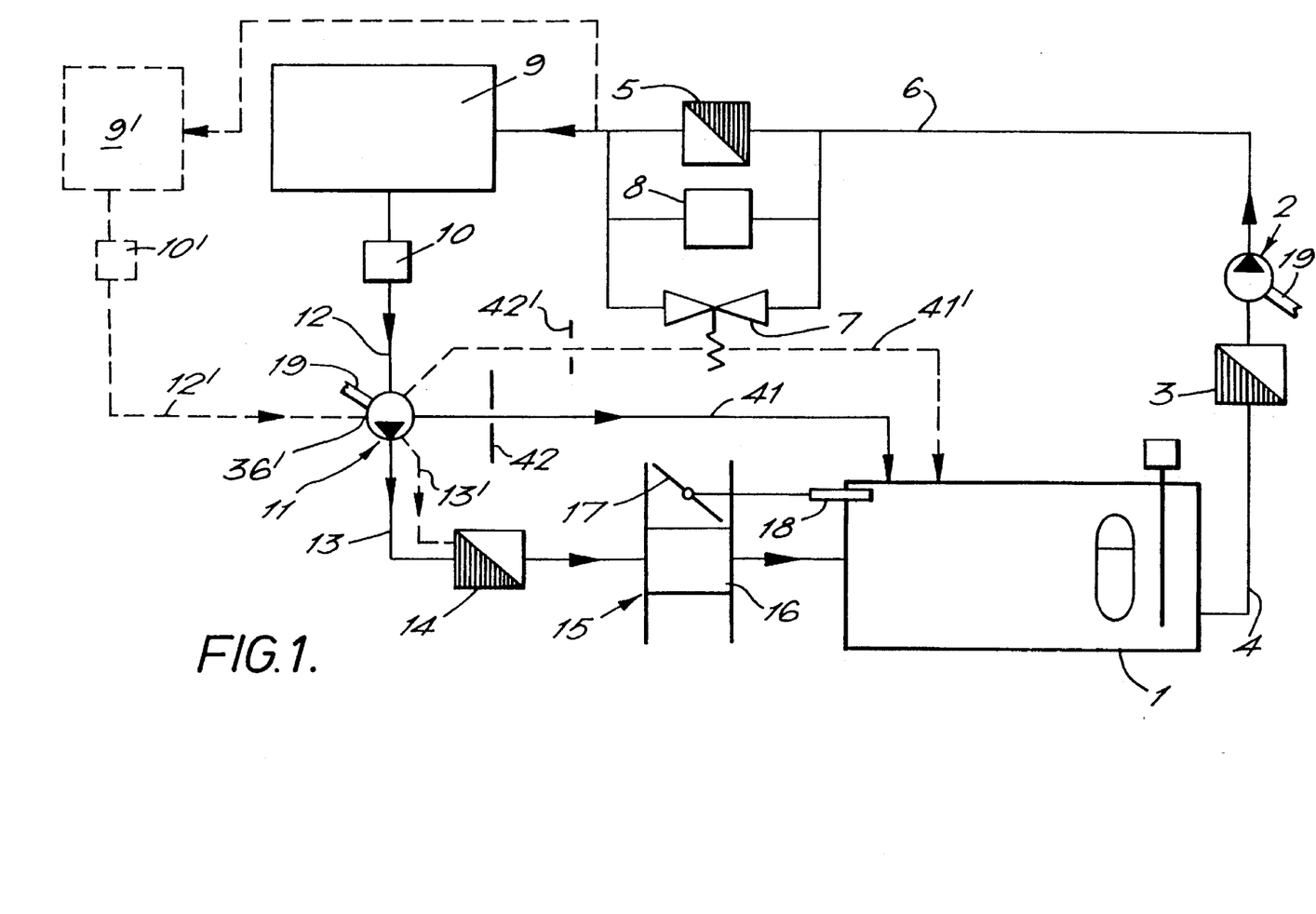
FIG. 1 is a schematic diagram of a gearbox lubrication system according to the invention.

A tank 1 serves as a reservoir for lubricating oil in the system. Oil is drawn from the tank by a regenerative type pump 2 via a filter 3 and connection 4, and is supplied to a gearbox 9 via a filter 5 and connection 6. A pressure relief valve 7 and a pressure differential indicator 8 are connected in parallel across the filter 5 to protect against the adverse effects of a dirty or blocked filter. Oil supplied to the gearbox 9 lubricates the moving parts and drains into a sump 10 for return to the tank 1. A second regenerative type pump 11 pumps the oil from the sump 10 via a connection 12 and passes this oil via a connection 13, filter 14 and cooler 15 to the tank 1. The cooler 15 shown in FIG. 1 is air cooled, the oil passing through a cooler body 16 and an air flow control valve 17 serving to control a flow of air over the cooler body dependent on the temperature of the oil in the tank 1 sensed by a sensor 18.

Figure 2:
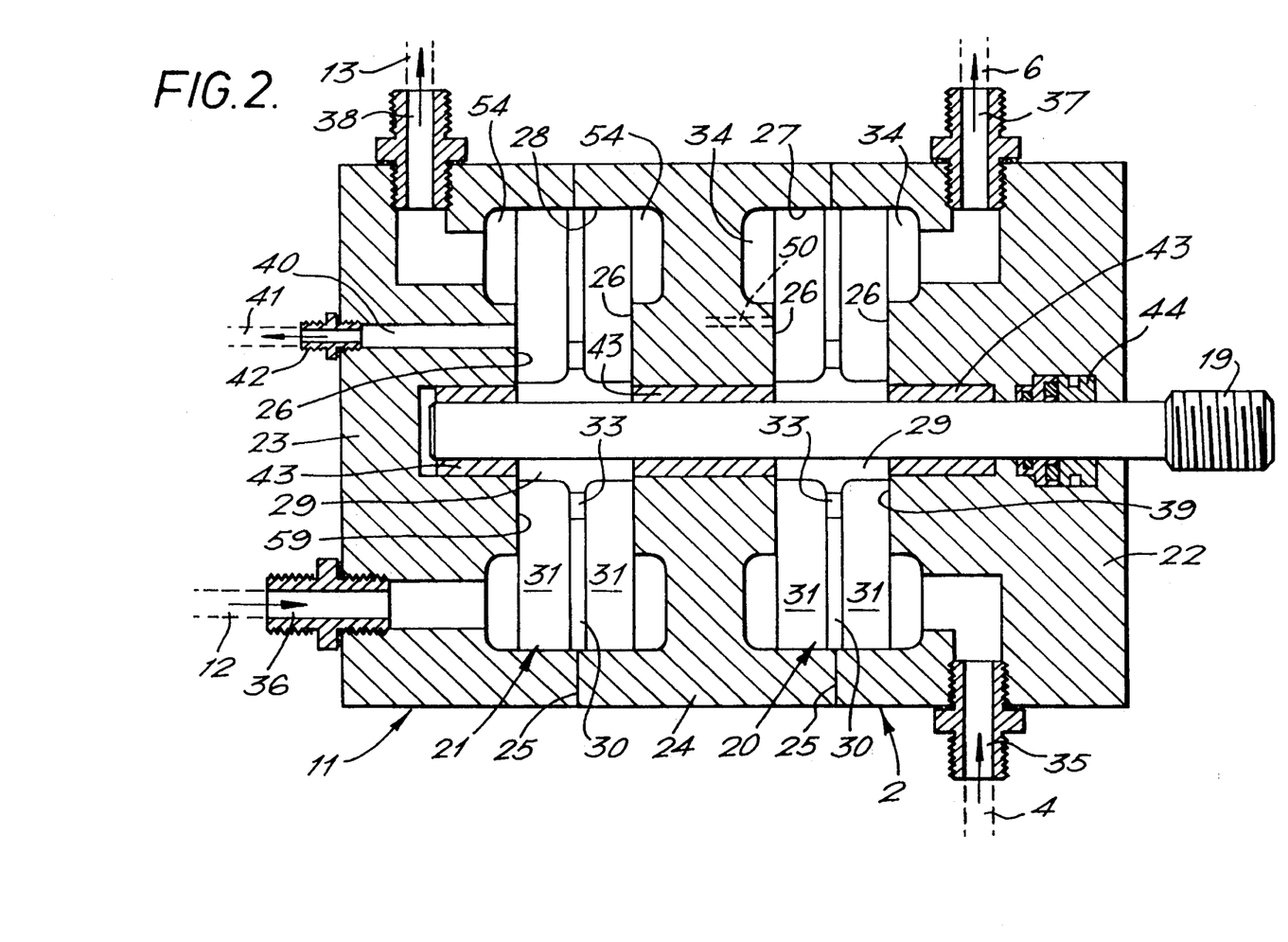
FIG. 2 is an axial section through the two pumps of the system mounted on a common drive shaft.

The two regenerative type pumps 2 and 11 are incorporated into a housing assembly with a common drive shaft 19 carrying the impeller 20,21 of each pump as shown in FIG. 2. The housing assembly comprises two end sections 22,23 and an intermediate section 24 which are secured axially together in face-to-face engagement. The cooperating side faces 25 of these sections 22, 23, 24 are formed with circular recesses 26 which together form respective cylindrical chambers 27, 28 to receive the impellers 20,21 as close peripheral fit.

Figures 4, 5:
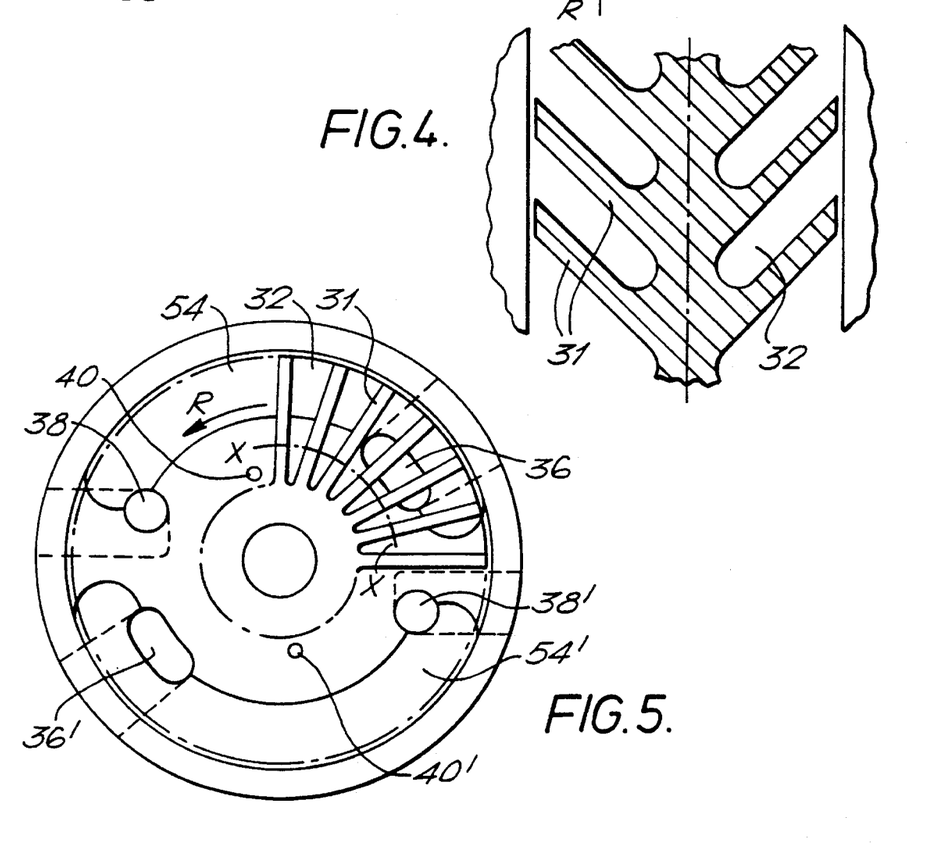
FIG. 4 is a section along the line X—X in FIG. 3.
FIG. 5 is an end view similar to FIG. 3 of a pump having multiple guide channels on a common radius to provide multiple oil scavenge functions.

Each impeller 20,21 comprises a hub 29 mounted on the drive shaft 19 and a ring 30 that extends radially outwards from the hub and carries a set of blades 31 on both sides that extend laterally and radially of the ring 30. The blades 31 are formed integrally with the hub 29 and ring 30 and conform to a cylindrical profile to match the chamber 27,28 in which it is received. The blades 31 on each side of the ring extend away from the ring in the direction of rotation R of the impeller at an angle of approximately 45 degrees to the central plane of rotation of the ring, as shown in FIG. 4. The spaces 32 between the blades 31 define a ring of cells on each side of the impeller joined at their inner ends by axial holes 33 through the ring 30 between adjacent cells 32 on opposite sides thereof.

A guide channel 34,54 is formed in each end wall of each chamber 27,28 respectively on opposite sides of the impellers 20,21 so as to open into the respective chambers. Each channel 34,54 extends alongside the outer portion of the impeller over an angle of approximately 315 degrees between a respective pump inlet 35,36 and a respective pump outlet 37,38. The uninterrupted portion 39,59 of the end wall of the chamber between the ends of the guide channel 34,54 acts as a stripper which limits the direct flow of fluid from the pump outlet 37,38 to the pump inlet 35,36, as will become apparent in the following description of the operation of the pumps.

In operation, the impeller 20 of the first pump 2 rotates in the direction R and serves to produce a radially outward flow of fluid in the cells 32 through centrifugal action. At the outer periphery of the rotor, the fluid is directed laterally outwards into the guide channel 34 where it is recirculated inwards back into the cells 32. This recirculating action continues along the whole length of each guide channel 34 as the impeller rotates, thereby increasing the pressure of the fluid until it is discharged through the pump outlet 37. It will be appreciated that fluid is carried in the cells 32 across the stripper 39 between the closed ends of the guide channel 34, but the close proximity of the outer edges of the blades 31 to the inner surface of the stripper 39 limits the flow of fluid directly therebetween from the pump outlet 37 back to the pump inlet 35. The impeller 20 of the first pump 2 therefore raises pressure to pump the lubricating oil from the tank 1 to the gearbox 9.

The impeller 21 of the second pump 11 rotating on the same shaft 19 as the impeller 20 of pump 2, operates in a similar manner and raises pressure between the pump inlet 36 and pump outlet 38 to pump the lubricating oil from the sump 10 of the gearbox 9 back to the tank 1. However, the pump 11 also incorporates an air bleed in the form of a passage 40 in the respective end section 23 of the housing which opens into the chamber 28 at a location radially inwards from the guide channel 54 towards the inner ends of the cells 32. Any air or gas in the oil drawn in from the sump 10 tends to collect at the inner ends of the cells 32 because of its lower density, and is pressurised by the oil. Preferably, the passage 40 is located circumferentially midway between the pump inlet 36 and outlet 38, for example, within the central third or two thirds of the circumferential distance therebetween so that the air is most efficiently removed. A connection 41 connects the passage 40 to the tank 1 and incorporates a restrictor 42 to preserve the pressure within the pump. This restrictor 42 may take the form of the connector between the passage 40 and the connection 41. The outlet of the connection 41 opens into the air space above the oil in the tank 1 to allow the oil mist bled off with the air to settle in the tank.

It will be appreciated that the pump assembly shown in FIG. 2 is simple in design, involving just a few components, and can be made both compact and lightweight. The drive shaft 19 is driven at one end which extends from the housing. Plain bearings 43 support the shaft 19 in the housing, and a seal assembly 44 seals against the leak of oil along the shaft.

In an alternative embodiment of the invention, the first pump 2 may also be provided with an air bleed 50 (shown in broken lines in FIG. 2) similar to the air bleed passage 40 of pump 11 so that any air that may be present in the oil drawn from the tank 1 is removed in the pump 2. This second air bleed passage 50 would conveniently be connected to that of the pump 11 so that both feed air to the tank via the same connection 41.

In an alternative embodiment of the invention as shown in FIG. 5, the guide channels 54 of the second pump 11 are shortened circumferentially so as to extend less than 180 degrees around the shaft 19, and a second pair of guide channels 54' are formed in the end walls of the chamber 28 on opposite sides of the impeller 21, and on the same radius as the guide channels 54 but diametrically opposite these guide channels 54. Pump inlet and outlet ports 36',38' are provided in the housing section 23 at opposite ends of the guide channels 34' so that the impeller operates to pump fluid from the inlet port 35' to the outlet port 38'.

As shown in FIG. 1, the inlet port 36' is connected via a connection 12' to the sump 10' of another gearbox 9' that is supplied with lubricating oil from the first pump 2, like the gearbox 9, so that the second pump 11 re-circulates lubricating oil from the sump 10' to the tank 1 via a connection 13'. Any air in the recirculated oil in the guide channels 54' of the second pump 11 tends to collect at the inner ends of the cells 32 and is removed via a passage 40' located circumferentially adjacent to the pump outlet port 38'. Air pressurised by the pump passes via the passage 40', connection 41' and restrictor 42' to the top of the tank 1.

In other embodiments, instead of just two guide channels 54,54', the second pump (11) may be provided with three or more guide channels on a common radius, each lying within a similar limited angular range about the shaft 19, and having its own pump inlet and outlet port, and an air bleed passage.

Figure 3:
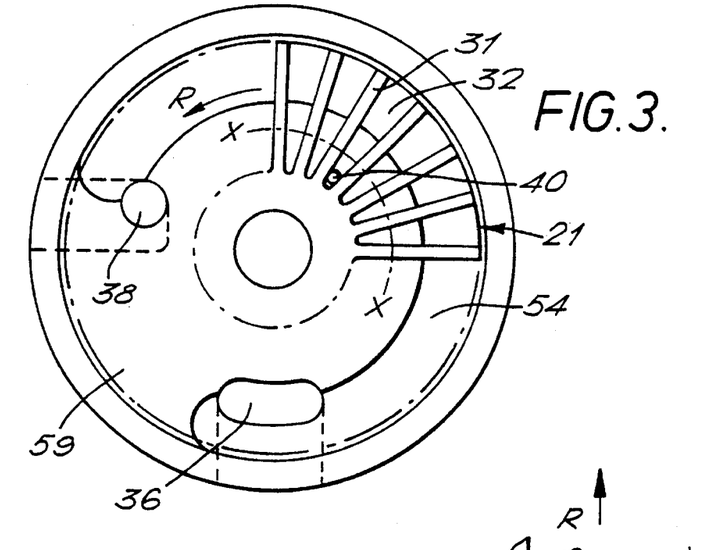
FIG. 3 is an end view of the impeller and pump housing of the left-hand pump in FIG. 2.

In another alternative embodiment of the invention, the holes 33 in the ring 30 of the impeller 21 are omitted so as to separate the two sides of the impeller 21, and the guide channels 54 of FIG. 3 on each side of the impeller 21 are connected to separate pump inlet ports 36 and outlet ports 38 on each side of the impeller so that each functions as a separate scavenge pump from the other, each guide channel 54 being provided with its own air bleed passage 40.

In yet another alternative embodiment of the invention, the holes 33 in the ring 30 of the impeller 21 are omitted so as to separate the two sides of the impeller 21, and a pair of guide channels 54,54' in FIG. 5 are provided on a common radius on each side of the impeller 21, and corresponding pairs of pump inlet and outlet ports 36,38; 36',38' are provided on each side of the impeller 21 so as to provide four separate scavenge pumps, a corresponding air bleed passage 40,40' being provided for each guide channel.

In any of the embodiments described above, the first pump 2 may be modified to have two or more separate outlets instead of the one outlet 37. For example, the guide channels 34 on each side may be separated by omitting the axial holes 33, and providing each with its own separate inlet 35 and outlet 37. Alternatively or additionally, each guide channel 34 may be divided into two to more guide channels extending end-to-end circumferentially around the impeller, and each is provided with its own separate inlet 35 and outlet 37.

Figure 6:
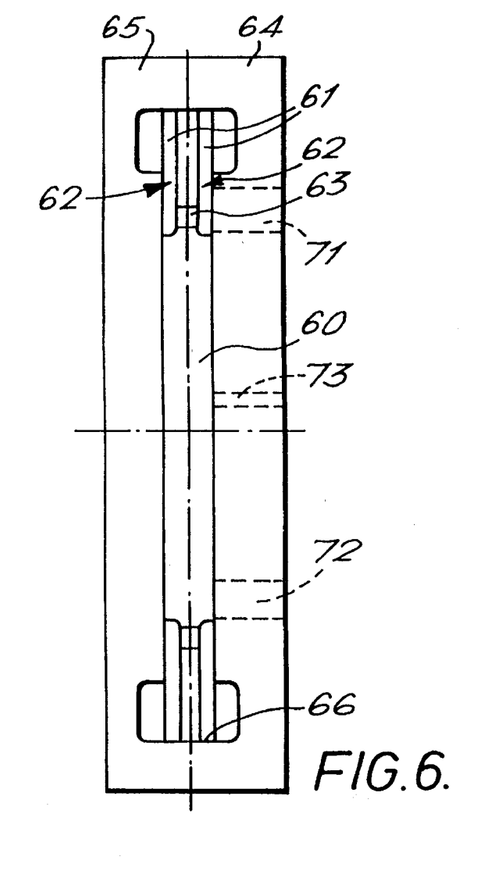
FIG. 6 is an axial section through the pump means comprising a single impeller for use according to an alternative embodiment of the invention.
Figure 7:
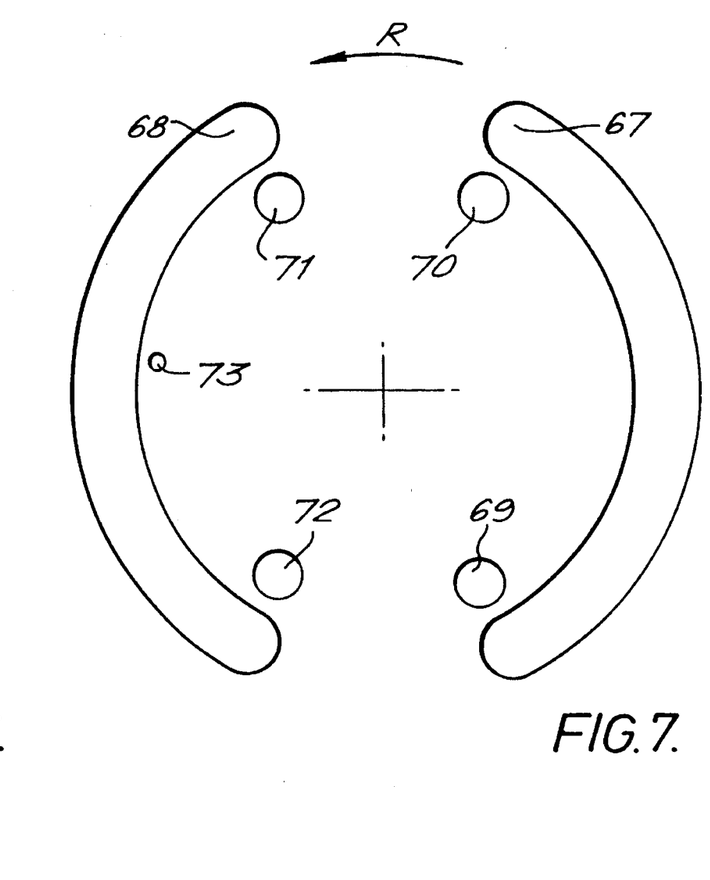
FIG. 7 is an end view of the pump housing of the pump means in FIG. 6.

An alternative embodiment of the invention is shown in FIGS. 6 and 7 comprising a single impeller 60 which incorporates both the first and second regenerative pump means. The impeller 60 is generally similar to the impellers 20,21 of the proceeding embodiments comprising a set of radially outwardly directed blades 61 around the periphery of the impeller on both sides, the blades defining a ring of cells 62 on both sides joined at their inner ends by axial holes 63 through the impeller 60. The blades 61 extend axially and circumferentially from the impeller at an angle of approximately 45 degrees to its central plane of rotation, and are directed in the direction of rotation of the impeller, as shown in FIG. 4. The pump housing comprises two sections 64,65 connected axially together in face-to-face engagement and defining between them a cylindrical chamber 66 to receive the impeller 60 as a close peripheral fit.

A pair of guide channels 67,68 is formed in each end wall of the chamber 66 on opposite sides of the impeller 60 so as to open into the chamber alongside a ring of cells 63 on the impeller. The guide channels 67,68 all extend circumferentially on the same radius, but each guide channel extends over an angle of approximately 135 degrees only, so that each pair of guide channels 67,68 is arranged symmetrically about the axis of the impeller, as shown in FIG. 7. A first one of these guide channels 67 of each pair, extends between a pump inlet port 69 and a pump outlet port 70, and in operation, lubricating oil supplied at the inlet port 69 is pumped under pressure to the outlet port 70. The first guide channels 67 and impeller 60 are therefore the equivalent of the first pump 2 in FIG. 1, and can be connected in this system in place of pump 2 to pump lubricating oil from the tank 1 to the gearbox 2.

A second one of these guide channels 68 of each pair, extends between a pump inlet port 71 and a pump outlet port 72, and in operation, lubricating oil supplied at the inlet port 71 is pumped under pressure to the outlet port 72. The second guide channels 68 and impeller 60 are therefore the equivalent of the second pump 11 in FIG. 1, and can be connected in this system in place of pump 11 to pump lubricating oil from the sump 10 of the gearbox 9 back to the tank 1. Also, as with the second pump 11, an air bleed is provided in the form of a passage 73 in an end wall of the chamber 66 at a location radially inwards of the second guide channels 68 towards the radially inner ends of the cells 62. Any air or gas in the oil drawn from the sump 10 tends to collect at the inner ends of the cells 62 because of its lower density, and is pressurised by the oil. Preferably, the passage 73 is located circumferentially adjacent a central region of the respective second guide channel 68. In operation, the passage 73 is connected in the connection 41 of the system of FIG. 1, to the air space above3 the oil in the tank 1 to allow the oil mist bled off with the air to settle in the tank.

In an alternative embodiment based on that of FIGS. 6 and 7, the holes 63 in the impeller 60 are omitted so as to separate the two sides of the impeller and thereby produce two separate first pump means comprising the separate first guide channels 67, and two separate second pump means comprising the separate second guide channels 68. Each first pump means 67 can then be provided with its own inlet and outlet ports 69,70, and be connected in a lubricating system to supply oil to separate equipment, and each second pump means 68 can be provided with its own inlet and outlet ports 71,72 and air bled passage 73 and connected in the system to scavenge oil from separate equipment.

In other alternative embodiments based on that of FIGS. 6 and 7, either or both of the first and second guide channels 67,68 may be divided into two or more guide channels extending end-to-end circumferentially around the impeller, and each being provided with its own separate inlet and outlet port and air bleed passage where required, and being used as a separate oil supply pump or oil scavenge pump in a lubricating system. These shorter guide channels 67,68 may be connected as pair on opposite sides of the impeller via the axial holes 63, or may be kept separate if the holes 63 are omitted.

Figure 8:
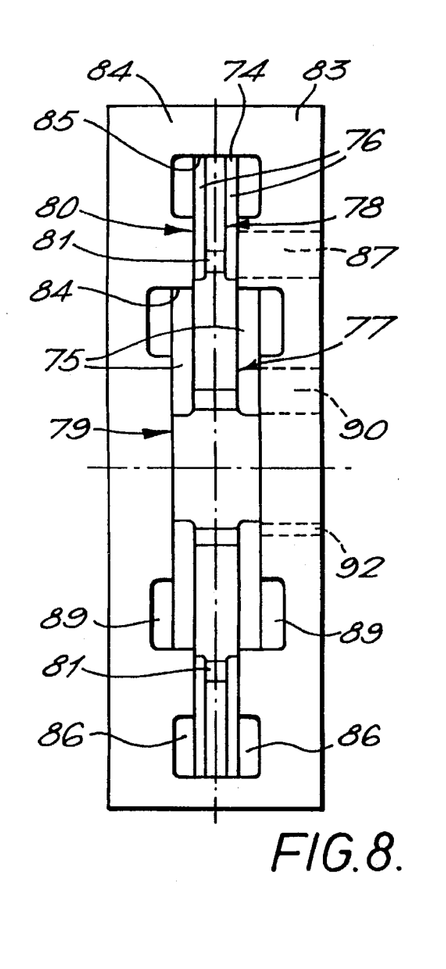
FIG. 8 is an axial section through two pump means comprising a single impeller for use according to another alternative embodiment of the invention.
Figure 9:
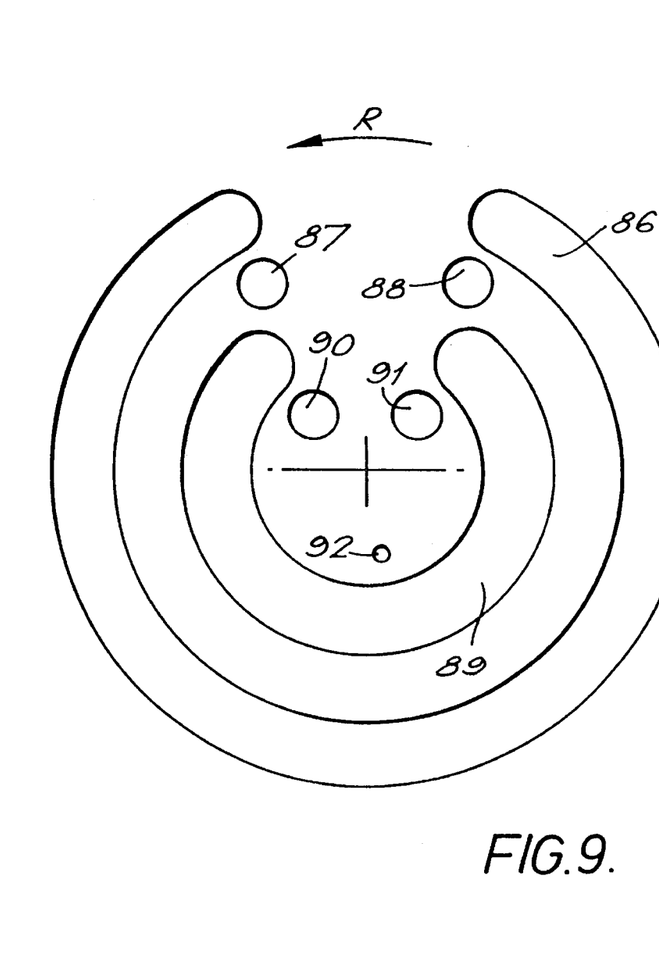
FIG. 9 is an end view of the pump housing of the pump means in FIG. 8.

An alternative embodiment of the invention is shown in FIGS. 8 and 9, which like the embodiment of FIGS. 6 and 7, also comprises a single impeller 74 which incorporates both the first and second regenerative pump means. However, the first and second pump means are formed on different radii of the impeller. Thus, the impeller comprises two sets of radially outwardly directly blades 75,76 on each side of the impeller, each defining a ring of cells 77,78. The impeller 74 comprises an inner portion 79 which is formed with an inner set of blades 75 around its periphery on both sides, and an outer portion 80 narrower than the inner portion 79 which is formed with an outer set of blades 76 around its periphery on both sides. In each case, the blades 75,76 are angled as in the embodiment of FIGS. 6 and 7. Both the inner rings of cells 77 on opposite sides of the impeller, and the outer rings of cells 78 on opposite sides of the impeller are connected by axial holes 81 at the inner ends of the cells 77,78.

The pump housing comprises two sections 82,83 connected axially together in face-to-face engagement and defining between them an inner cylindrical chamber 84 to receive the inner portion 79 of the impeller, and an outer cylindrical chamber 85 to receive the outer portion 80 of the impeller. In each case, the outer periphery of the inner and outer portions 79,80 of the impeller are a close fit with the housing sections 82,83.

A pair of guide channels 86 is formed in the end walls of the outer chamber 85 on opposite sides of the impeller on the same radius so as to open axially into the outer ring of cells 78 on the impeller. These outer guide channels 86 extend circumferentially over an angle of approximately 300 degrees between a pump inlet port 87 and a pump outlet port 88, and in operation, lubricating oil supplied at the inlet port 87 is pumped to the outlet port 88 for supply to a gearbox 9 in a lubricating system such as shown in FIG. 1, which the first pump 2 is replaced by first pump means consisting of the outer pair of guide channels 86 and the outer rings of cells 78.

A pair of inner guide channels 89 is formed in the end walls of the inner chamber 84 on opposite sides of the impeller on the same radius so as to open axially into the inner ring of cells 77 on the impeller. These inner guide channels 89 extend circumferentially over an angle of approximately 300 degrees between a pump inlet port 90 and a pump outlet port 91, and in operation, lubricating oil is pumped from the inlet 90 to the outlet port 91 for scavenging oil from the sump 10 of the gearbox 9 in the lubricating system of FIG. 1, in which the second pump 11 is replaced by second pump means consisting of the inner pair of guide channels 89 and the inner ring of cells 77.

An air bleed is provided in the form of a passage 92 in an end wall of the inner chamber 84 at a location adjacent to the central region of the inner guide channels 89 and radially inwards of the inner guide channels 89 towards the inner ends of the inner cells 77. In operation, the passage 92 is connected via the connection 41 of the system in FIG. 1, to the air space above the oil in the tank 1 to return air and oil mist that accumulates at the inner ends of the inner cells 77 to the air space above the oil in the tank 1.

In an alternative embodiment based on that of FIGS. 8 and 9, the holes 81 in the impeller are omitted, and the outer guide channels 86 on each side of the impeller are provided with their own inlet and outlet ports 87,88, and the inner guide channels 89 on each side of the impeller are provided with their own inlet and outlet ports 90,91 and air bleed passages 92. Each inner or outer guide channel can then be connected into a lubricating system to operate as a separate oil supply pump or scavenge pump.

In another alternative embodiment of the invention, the functions of the respective inner and outer guide channels 89,86 in FIGS. 8 and 9 can be reversed, the air bleed passage 92 being relocated adjacent to the inner central region of the outer guide channels 86, and the outer guide channels being used as the scavenge pump to replace the second pump 11 in FIG. 1, and the inner guide channels 89 being used as the oil supply pump to replace the first pump 2 in FIG. 1.

In yet another alternative embodiment of the invention, a third guide channel is provided in the pump housing 83,84 on each side of the impeller 74 on a different radius to those of guide channels 86,89, and a corresponding third series of cells is provided on each side of the impeller 74 on the same radius as the third pair of guide channels. Third inlet and outlet ports and a third air bleed passage are also provided for the third pair of guide channels so that they operate as an additional oil scavenge pump when connected in the lubrication system.

In other embodiments based on that of FIGS. 8 and 9, either or both of the inner and outer guide channels 89,86 may be divided into two or more guide channels extending end-to-end circumferentially around the impeller, and each being provided with its own separate inlet and outlet ports and air bleed passage where required, and being used as a separate oil supply pump or oil scavenge pump in a lubricating system. These shorter guide channels 89,86 may be connected as pairs on opposite sides of the impeller via the axial holes 81, or may be kept separate if the holes 81 are omitted.

In yet another alternative embodiment of the invention, the second pump 11 in FIG. 2 is replaced by a pump as shown in FIG. 8 with an impeller having two series of cells 78,77 on different radii on each side, and housing sections 83,84 on opposite sides of the impeller formed with guide channels 86,89 alongside the series of cells 78,77 respectively. Each pair of guide channels 86 and 89 are connected via the axial holes 81 in the impeller, and extend between respective inlet ports 87,90 and respective outlet ports 88,91. Also, each pair of guide channels 86,89 is provided with a respective air bleed passage 92 so that each pair of guide channels can be connected in the lubricating system of FIG. 1 as a separate scavenge pump, each air bleed passage 92 being connected to the tank 1 via a respective connection 41,41'.

In yet other embodiments of the invention, the first pump 2, as shown in FIG. 2, may be modified so that the impeller 21 takes the form shown in FIG. 8, and the single pair of guide channels 34 are replaced by the two concentric pair of guide channels 86,89 shown in FIGS. 8 and 9. The air bleed passage 92 is omitted and both the inner and outer guide channels 86,89 are each used as separate pumps pumping oil from separate inlet ports 87,90 to separate outlet ports 88,91.

We claim:

1. A lubrication system comprising first regenerative type pump means to deliver lubricating oil from a reservoir to equipment to be lubricated, and second regenerative pump means to return lubricating oil from the equipment to the reservoir, both pump means being incorporated in one impeller mounted on a drive shaft in a housing, with the second pump means having an air bleed connected to the reservoir from an inner region of the pump impeller in which air accumulates.

2. A lubrication system as claimed in claim 1 in which the second pump means comprises two or more guide channels formed in the pump housing alongside the pump impeller each lying adjacent a series of cells on the impeller that open laterally into the guide channel and induce a flow of fluid along the guide channel between a respective pump inlet port and pump outlet port, each guide channel and respective pump inlet and outlet ports forming a separate pumping circuit to return lubricating oil from the equipment to the reservoir, and each guide channel having a corresponding air bleed passage connected to the reservoir from an inner region of the pump impeller in which air accumulates.

3. A lubrication system as claimed in claim 2 in which said two or more guide channels are formed on a common radius in the pump housing on the same side of the impeller.

4. A lubricating system as claimed in claim 2 in which said two or more guide channels are formed in the pump housing on different radii on the same side of the impeller, and a separate series of cells is provided on the impeller adjacent to said guide channels so that each guide channel functions as a separate pump circuit with corresponding pump inlet and outlet ports and an air bleed passage.

5. A lubricating system as claimed in claim 4 in which for every guide channel formed in the pump housing on said same side of the impeller, there is a corresponding guide channel formed in the pump housing on the other side of the impeller aligned axially with it, and in which the respective series of cells on opposite sides of the impeller alongside each guide channel are connected by axial holes through the impeller.

6. A lubrication system as claimed in claim 2 in which two or more guide channels are formed on a common radius in the pump housing on opposite sides of the impeller, and a separate series of cells is provided on each side of the impeller adjacent to said guide channels so that each guide channel functions as a separate pump circuit with corresponding pump inlet and outlet ports and an air bleed passage.

7. A lubricating system as claimed in claim 1 in which the first pump means comprises two or more guide channels formed in the pump housing alongside the pump impeller, each lying adjacent a series of cells on the impeller that open laterally into the guide channel and induce a flow of fluid along the guide channel between a respective pump inlet port and pump outlet port, each guide channel and respective pump inlet and outlet ports forming a separate pumping circuit to supply lubricating oil to the equipment.

* * * * *